United States Patent
Weed et al.

(10) Patent No.: US 9,557,418 B2
(45) Date of Patent: Jan. 31, 2017

(54) GROUND-BASED SYSTEM AND METHOD TO EXTEND THE DETECTION OF EXCESSIVE DELAY GRADIENTS USING PARITY CORRECTIONS

(71) Applicant: Honeywell International Inc., Morristown, NJ (US)

(72) Inventors: Douglas Weed, Forest Lake, MN (US); Randy J. Reuter, Brooklyn Park, MN (US)

(73) Assignee: Honeywell International Inc., Morris Plains, NJ (US)

( * ) Notice: Subject to any disclaimer, the term of this patent is extended or adjusted under 35 U.S.C. 154(b) by 409 days.

(21) Appl. No.: 14/253,445

(22) Filed: Apr. 15, 2014

(65) Prior Publication Data
US 2015/0293231 A1 Oct. 15, 2015

(51) Int. Cl.
*G01S 19/04* (2010.01)
*G01S 19/03* (2010.01)
*G01S 19/08* (2010.01)
*G01S 19/20* (2010.01)

(52) U.S. Cl.
CPC ............. *G01S 19/04* (2013.01); *G01S 19/08* (2013.01); *G01S 19/20* (2013.01)

(58) Field of Classification Search
USPC .............. 342/357.26, 357.4, 357.41, 357.46; 701/468, 469
See application file for complete search history.

(56) References Cited

U.S. PATENT DOCUMENTS

| 5,041,833 A | 8/1991 | Weinberg |
| 5,477,458 A | 12/1995 | Loomis |
| 5,786,773 A | 7/1998 | Murphy |

(Continued)

FOREIGN PATENT DOCUMENTS

| KR | 101074641 | 10/2011 |
| WO | 2008141320 | 11/2008 |
| WO | 2009103745 | 8/2009 |

OTHER PUBLICATIONS

Weed et al., "Ground-Based System and Method to Extend the Detection of Excessive Delay Gradients Using Dual Processing", "U.S. Appl. No. 14/253,431, filed Apr. 15, 2014", Apr. 15, 2014, pp. 1-43, Published in: US.

(Continued)

*Primary Examiner* — Dao Phan
(74) *Attorney, Agent, or Firm* — Fogg & Powers LLC (57) ABSTRACT

A processing function to monitor a horizontal delay gradient in satellite signals is provided. The processing function includes a satellite differencing module, a double differencing module, a parity test module, and a gradient estimator module. The satellite differencing module receives carrier phase measurements for at least two satellites from at least three reference receivers. The satellite differencing module determines differences in the carrier phase measurements between signals from the monitored satellite and at least one of the at least one other satellite. The double differencing module: forms double-differences between pairs of the reference receivers; compensates the double-differences between the pairs; performs a modulo operation; and averages the double differences. The parity test module inputs the averaged compensated double differences when the average exceeds a parity enable threshold. The gradient estimator module configured is to estimate a magnitude of the horizontal delay gradient.

20 Claims, 4 Drawing Sheets

(56) References Cited

U.S. PATENT DOCUMENTS

| | | | |
|---|---|---|---|
| 6,603,426 | B1 | 8/2003 | Clark |
| 6,674,398 | B2 | 1/2004 | Murphy |
| 6,859,690 | B2 | 2/2005 | Asher et al. |
| 7,089,452 | B2 | 8/2006 | Rubin et al. |
| 7,095,369 | B1 | 8/2006 | Clark |
| 7,310,062 | B1 | 12/2007 | Hwang |
| 7,388,539 | B2 | 6/2008 | Whitehead et al. |
| 7,477,183 | B2 | 1/2009 | Watson et al. |
| 7,548,196 | B2 | 6/2009 | Fagan et al. |
| 8,094,064 | B2 | 1/2012 | Brenner |
| 2005/0146461 | A1 | 7/2005 | Pande et al. |
| 2006/0047413 | A1 | 3/2006 | Lopez et al. |
| 2006/0273953 | A1 | 12/2006 | Watson et al. |
| 2009/0262013 | A1 | 10/2009 | Vollath |
| 2014/0035778 | A1 | 2/2014 | Berlin de la Hautiere et al. |
| 2015/0293230 | A1 | 10/2015 | Weed et al. |

OTHER PUBLICATIONS

European Patent Office, "Extended European Search Report from EP Application No. 15153379.1 mailed Jul. 3, 2015", "from Foreign Counterpart of U.S. Appl. No. 14/253,445", Jul. 3, 2015, pp. 1-6, Published in: EP.

Arthur, "The Disparity of Parity, Determining Position Confidence Bounds in the Presence of Biases", "ION GNSS 18th International Technical Meeting of the Satellite Division", Sep. 13-16, 2005, pp. 1841-1853, Published in: Long Beach, CA.

Gratton et al., "Experimental Observations and Integrity Monitor Applications of LAAS IMLA Carrier Phase Measurements", Sep. 21-24, 2004, Publisher: ION GNSS 17th International Technical Meeting of the Satellite Division, Published in: Long Beach, CA.

Kline, "An Experimental Investigation of Relativistic Effects in GPS", "Navigation: Journal of the Institute of Navigation", Winter 1998-1999, pp. 297-305, vol. 45, No. 4.

Lee et al., "Enhancements of Long Term Ionospheric Anomaly Monitoring for the Ground-Based Augmentation System", "Proceedings of the 2011 International Technical Meeting of the Institute of Navigation", Jan. 26, 2011, pp. 930-941.

Pervan et al., "Parity Space Methods for Autonomous Fault Detection and Exclusion using GPS Carrier Phase", "1996 Position Location and Navigation Symposium", Apr. 22-26, 1996, pp. 649-656, Published in: Atlanta, GA.

Reuter et al., "Ionosphere Gradient Detection for Cat III GBAS", "25th International Technical Meeting of the Satellite Division of the Institute of Navigation", Sep. 17-21, 2012, pp. 2175-2183, Published in: Nashville, TN.

Sturza, "Navigation System Integrity Monitoring Using Redundant Measurements", "Navigation: Journal of the Institute of Navigation", Winter 1988-89, pp. 483-501, vol. 35, No. 4.

GROUND-BASED SYSTEM AND METHOD TO EXTEND THE DETECTION OF EXCESSIVE DELAY GRADIENTS USING PARITY CORRECTIONS

GOVERNMENT LICENSE RIGHTS

This invention was made with Government support under Government Contract # DTFACT-10-C-00013 awarded by FAA WM J Hughes Technical Center. The Government has certain rights in the invention.

BACKGROUND

The electron density of the ionosphere varies as a function of geographic location and time. The International Civil Aviation Organization (ICAO) is developing standards to address the threat to navigation and guidance systems in aircraft stemming from an ionosphere anomaly, i.e., extreme changes in electron density of the ionosphere. The standard development has shown it is critical that ground monitoring for delay gradients in signals due to an ionosphere anomaly is absolute and not relative to previous satellite measurements. It is important to detect an extreme gradient from the very first set of measurements taken from a satellite as it moves into view of a ground-based GPS augmentation system.

In a ground station, carrier phase measurements from reference receiver pairs that are inconsistent with one another due to carrier wavelength ambiguity, can lead to missed detections or incorrect re-admittance of satellite data. For example, if the carrier phase measurement for one reference receiver pair is near $\pm\lambda/2$, then noise on this reference receiver pair may result in a carrier phase measurement of $-\lambda/2$ while a combination of other reference receiver pairs projected along the baseline of the first reference receiver pair may result in a carrier phase measurement of $+\lambda/2$. In this case, the carrier phase measurements, cancel each other in a currently available gradient monitor.

SUMMARY

The present application relates to a processing function to monitor a horizontal delay gradient in satellite signals. The processing function includes a satellite differencing module, a double differencing module, a parity test module, and a gradient estimator module. The satellite differencing module is configured to receive carrier phase measurements for at least two satellites from at least three reference receivers, the at least two satellites including a monitored satellite and at least one other satellite. The at least three reference receivers have a known geometric relationship to each other. The satellite differencing module determines differences in the carrier phase measurements between signals from the monitored satellite and at least one of the at least one other satellite. The double differencing module is configured to: form double-differences between one or more pairs of the at least three reference receivers based on the differences in the carrier phase measurements; compensate the double-differences between the pairs for the known difference-in-position of the reference receivers in the pairs; perform a modulo operation to limit the compensated double-differences to a range of minus one-half wavelength to plus one-half wavelength; and for the monitored satellite, average the double differences over the other satellites among the at least two satellites. The parity test module is configured to input the averaged compensated double differences when the average of the compensated double differences over the other satellites among the at least two satellites exceed a parity enable threshold. The gradient estimator module is configured to estimate a magnitude of the horizontal delay gradient based on a set of the averaged compensated double-differences input from the parity test module.

DRAWINGS

In accordance with common practice, the various described features are not drawn to scale but are drawn to emphasize features relevant to the present invention. Like reference characters denote like elements throughout figures and text.

DETAILED DESCRIPTION

The excessive delay gradient monitor is one of the most demanding monitors in a ground station. The excessive delay gradient monitor requires the carrier accuracy be held to millimeter levels. The horizontal delay gradient monitor described herein ensures that reference receivers including at least two pairs of reference receivers do not degrade the performance of the horizontal delay gradient monitor. The horizontal delay gradient monitor detects the horizontal component of a delay gradient affecting signals received at the ground station by using carrier phase measurements from at least two reference receiver pairs and determines if the delay gradient is excessive. A delay gradient is excessive on a signal transmitted from a monitored satellite when greater than a selected gradient threshold.

The systems and methods described herein are configured to overcome the problem of missed detection or incorrect re-admittance for reference receiver pairs having measurements near $\pm\lambda/2$. Specifically, parity techniques are used to detect and correct for inconsistent carrier phase measurements. The smallest parity is selected from all measurement permutations (combinations of +/− sign changes on the carrier phase measurements). The parity test is enabled when a parity enable threshold is exceeded (as described below). When a parity enable threshold is not exceeded, the default carrier phase measurements are used without a parity test to avoid changing the nominal noise characteristics during fault free conditions. In one implementation of this embodiment, the parity enable threshold is $\pm\lambda/4$, where the satellite carrier wavelength is $\lambda$. The parity enable threshold is also referred to herein as "double-difference threshold".

Four or more reference receivers also provide redundant information, which improves sensitivity to horizontal delay gradients. The terms "anomalous delay gradient," "delay gradient," "ionospheric delay gradient," and "horizontal delay gradient" are used interchangeably herein.

Figure 1:
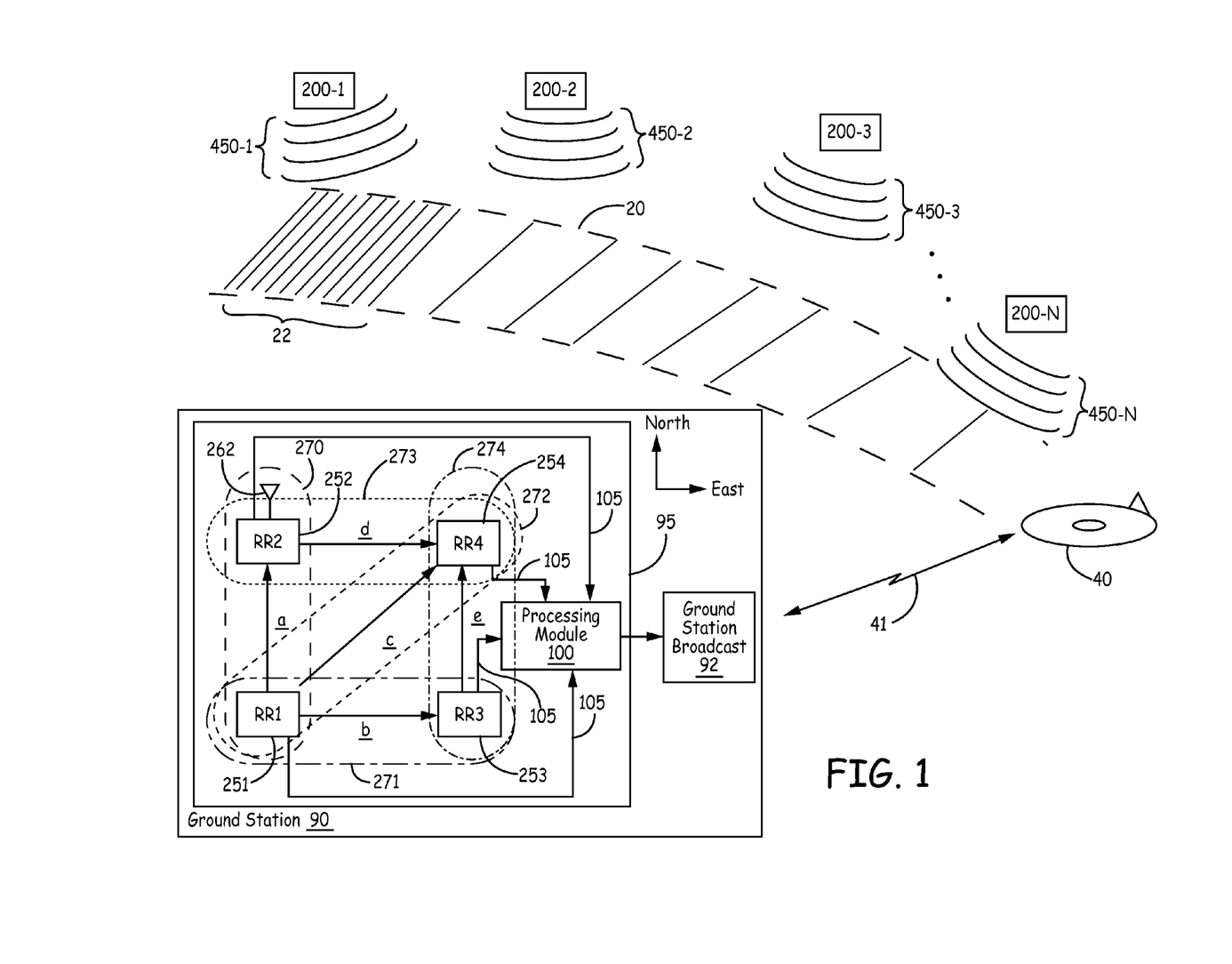
FIG. 1 shows an embodiment of a ground station to monitor for excessive delay gradients in satellite signals in accordance with the present invention.

FIG. 1 shows an embodiment of a ground station 90 to monitor for excessive delay gradients in satellite signals in accordance with the present invention. As shown in FIG. 1, the ground station 90 includes a horizontal delay gradient monitor 95 and a ground station broadcast 92. The ground station broadcast 92 is that portion of the ground station 90 that transmits signals via communication link 41 to aircraft 40 in the vicinity of the ground station 90. The horizontal delay gradient monitor 95 monitors for an excessive delay gradient present in the horizontal plane for signals 450-1 transmitted from a monitored satellite 200-1.

The horizontal delay gradient monitor 95 includes at least three reference receivers and a processing function 100. The at least three reference receivers 251-254 are positioned in a known geometric relationship to each other. The processing function 100 includes a plurality of functional modules executable by a processor and is also referred to as a "processing module 100" or a "processing function module 100". The exemplary embodiment of the ground station 90 shown in FIG. 1 includes four reference receivers 251-254 that are in a rectangular relationship to each other.

The known geometric relationship between the at least three reference receivers 251-254 is indicated by: vector $\underline{a}$ from the first reference receiver 251 to the second reference receiver 252; vector $\underline{b}$ from the first reference receiver 251 to the third reference receiver 253; vector $\underline{c}$ from the first reference receiver 251 to the fourth reference receiver 254; vector $\underline{d}$ from the second reference receiver 252 to the fourth reference receiver 254; vector $\underline{e}$ from the third reference receiver 253 to the fourth reference receiver 254.

Vector $\underline{a}$ is a known difference-in-position of the reference receivers 251 and 252 that form a reference receiver pair 270 (also referred to herein as pair 270). Vector $\underline{b}$ is the known difference-in-position of the reference receivers 251 and 253 that form the reference receiver pair 271 (also referred to herein as pair 271). Vector $\underline{c}$ is the known difference-in-position of the reference receivers 251 and 254 that form the reference receiver pair 272 (also referred to herein as pair 272). Vector $\underline{d}$ is the known difference-in-position of the reference receivers 252 and 254 that form the reference receiver pair 273 (also referred to herein as pair 273). Vector $\underline{e}$ is the known difference-in-position of the reference receivers 253 and 254 that form the reference receiver pair 274 (also referred to herein as pair 274).

The reference receivers in the pairs 270-273 have a known difference-in-position versus the reference receiver 251 that is common to all the pairs 270-273. An additional reference receiver pair between the second reference receiver 252 and the third reference receiver 253 is not shown but the processing described herein is capable of using that data from a reference receiver pair comprising the second reference receiver 252 and the third reference receiver 253 for a sixth pair measurement as described below.

The horizontal delay gradient has a horizontal component that lies in the plane that encompasses the reference receivers 251-254. The processing function 100 is communicatively coupled to each of the reference receivers 251-254. During operation, the horizontal delay gradient monitor 95 receives signals from at least two satellites 200(1-N). The reference receivers 251-254 are ground reference receivers also indicated herein as "RR's."

The radio frequency signals 450(1-N) shown generally as phase fronts are emitted from the satellites 200(1-N), respectively (where N is a positive integer). The radio frequency signals 450(1-N) propagate through the ionosphere generally represented by 20 to the ground station 90. The four reference receivers 251-254 receive radio frequency signals 450(1-N) from the monitored satellite 200-1 and from the other satellites 200(2-N). As is understood, each reference receiver 251-254 is a radio frequency receiver with an antenna, such as antenna 262 on reference receiver 252.

Only one antenna 262 (seen on the second reference receiver 252) is shown for clarity of illustration.

There can be anomalous delay gradients 22 in the ionosphere 20 that affect the phase of the radio frequency signals that propagate through the anomalous delay gradient 22. The anomalous delay gradient 22 is indicated by an increased density of cross-hatching in the ionosphere 20. For example, as shown in FIG. 1, the radio frequency signal 450-1 from the monitored satellite 200-1 passes through the anomalous delay gradient 22 as it propagates toward the four reference receivers 251-254. The delay gradient 22 results in a horizontal gradient as the signal is received on the surface of the earth. This means that the ionospheric delay of the received signal changes as a receiver is moved on the surface of the earth.

The radio frequency signals 450(1-N) transmitted from the respective satellites 200(1-N) are sampled at approximately the same time at the reference receivers 251-254. A register (not shown) in the reference receivers 251-254 stores a number indicative of the instant carrier phase angle of the received $n^{th}$ satellite radio frequency signal 450-n, where n is a positive integer. The register is continuously updated for the radio frequency signals received from the $n^{th}$ satellites 200-n in each of the reference receivers 251-254. The $n^{th}$ satellite radio frequency signal 450-n is from one of the at least two satellites. An instant read out of the register is referred herein to as the "carrier phase measurement," or "instantaneous carrier phase measurement." The carrier tracking loops (not shown) in the reference receivers 251-254 estimate the resulting phase and Doppler errors and update such a register for each of the N satellites 200(1-N) in view of the reference receivers 251-254. The down conversion for each reference receiver is common to all the N satellites 200(1-N), thus the instantaneous carrier phase indicated by the register can be used to determine the relative phase between received satellite signals within the range of 0° to 360°. The relative phase is the phase relationship between signals transmitted from the at least two satellites and simultaneously received at the reference receivers 251-254. The relative phase is thus the difference in the carrier phase measurement between the signals transmitted from the at least two satellites that are simultaneously received at the reference receivers 251-254.

The monitored satellite is that satellite for which a magnitude of the horizontal ionospheric delay gradient is monitored against a selected gradient threshold. The first satellite 200-1 is being referred to as the monitored satellite 200-1 in this document, but it is to be understood that the ground station 90 can monitor ionospheric delay gradient to two or more of the N satellites 200(1-N). Thus, the software modules in the processing function 100 are executable to monitor two or more of the N satellites 200(1-N) so that two or more of the satellites 200(1-N) are monitored satellites. In embodiments, all the satellites 200(1-N) are monitored satellites.

In the embodiments described herein, the length of the vectors $\underline{a}$, $\underline{b}$, $\underline{c}$, $\underline{d}$, and $\underline{e}$ are chosen to typically avoid carrier phase ambiguities, which are caused by a cyclical repeat of the same phase relation. The allowable geometric relationship between the reference receivers relates to the wavelength of the received signal, the range of acceptable delay gradients, and the expected noise on the carrier phase measurements. For an exemplary case, the wavelength λ, of the radio frequency signal transmitted by the satellites 200(1-N) is 19 cm. The delay gradients to be detected are within the range of −400 mm/km to +400 mm/km (i.e., 800 mm/km total range). The length of the vectors $\underline{a}$, $\underline{b}$, $\underline{c}$, $\underline{d}$, and e are in the range of 50 m to 200 m. In this exemplary case, the maximum carrier phase error $\delta x_c = 800$ mm/km×0.2 km=16 cm, which is less than the wavelength of 19 cm. However, if the carrier phase noise were to exceed this design margin or larger than expected gradients where to occur, then carrier phase ambiguities may lead to missed detections or incorrect re-admittance of satellite data.

In one embodiment, the ground station 90 is a GBAS ground station. Although the ground station 90 described herein is for an airport landing system, this invention can be implemented in systems that require accurate input from a global positioning system satellite and is not limited for use with aircraft and/or ground stations for aircraft.

Figure 2:
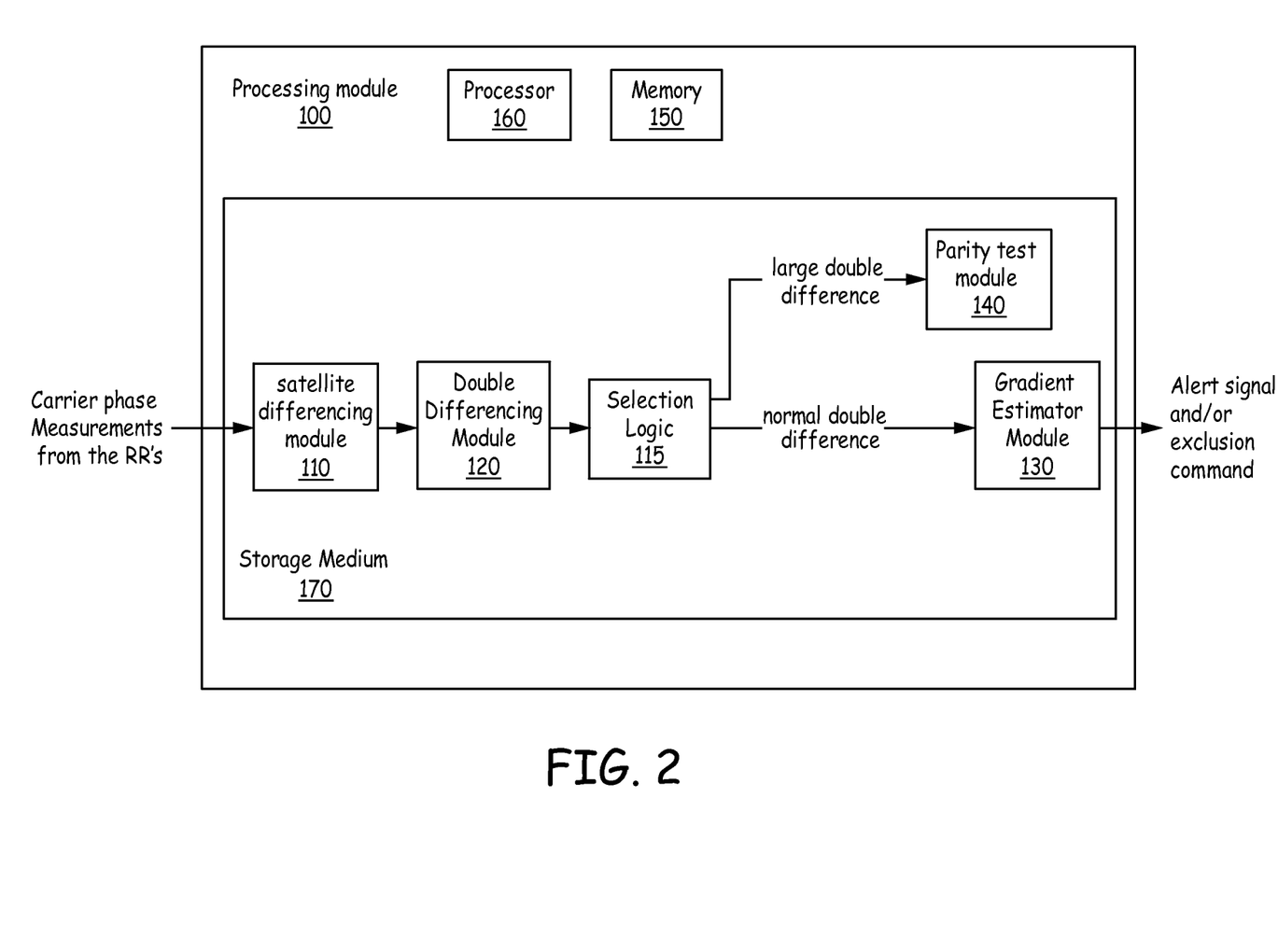
FIG. 2 shows an embodiment of a processing function in accordance with the present invention.

FIG. 2 shows an embodiment of a processing function 100 in accordance with the present invention. The processing function 100 includes a satellite differencing module 110, a double differencing module 120, selection logic 115, a parity test module 140, a gradient estimator module 130, a memory 150, and at least one processor 160. The satellite differencing module 110, the double differencing module 120, the parity test module 140, and the gradient estimator module 130 are software modules stored in a storage medium 170. The selection logic 115 is one of software, firmware, and/or hardware. The satellite differencing module 110, the double differencing module 120, parity test module 140, and the gradient estimator module 130 include computer readable medium encoded with computer instructions for performing the functions described herein. In one implementation of this embodiment, the satellite differencing module 110, the double differencing module 120, the parity test module 140, and the gradient estimator module 130 are the same module.

The satellite differencing module 110 is communicatively coupled to provide input to the double differencing module 120. The double differencing module 120 is communicatively coupled to provide input to the selection logic 115. The selection logic 115 is communicatively coupled to provide input to the parity test module 140 and gradient estimator module 130 based on the parity enable threshold. The parity test module 140 is communicatively coupled to provide input to the gradient estimator module 130. The processor 160 is communicatively coupled to execute software in the satellite differencing module 110, the double differencing module 120, the parity test module 140, and the gradient estimator module 130. The memory 150 is communicatively coupled to interface the satellite differencing module 110, the double differencing module 120, the parity test module 140, and the gradient estimator module 130 to each other as required to perform the functions described herein.

Memory 150 comprises any suitable memory now known or later developed such as, for example, random access memory (RAM), non-volatile memory, read only memory (ROM), and/or registers within the processor 160. The storage medium 170 comprises any storage device now known or later developed such as, for example, random access memory (RAM), non-volatile storage, read only memory (ROM). In one implementation, processor 160 comprises microprocessors or microcontrollers. Moreover, although the processor 160 and the memory 150 are shown as separate elements in FIG. 1, in one implementation, the processor 160 and memory 150 are implemented in a single device (for example, a single integrated-circuit device). In one implementation, the processor 160 comprises processor support chips and/or system support chips such as application-specific integrated circuits (ASICs).

Figure 3A:
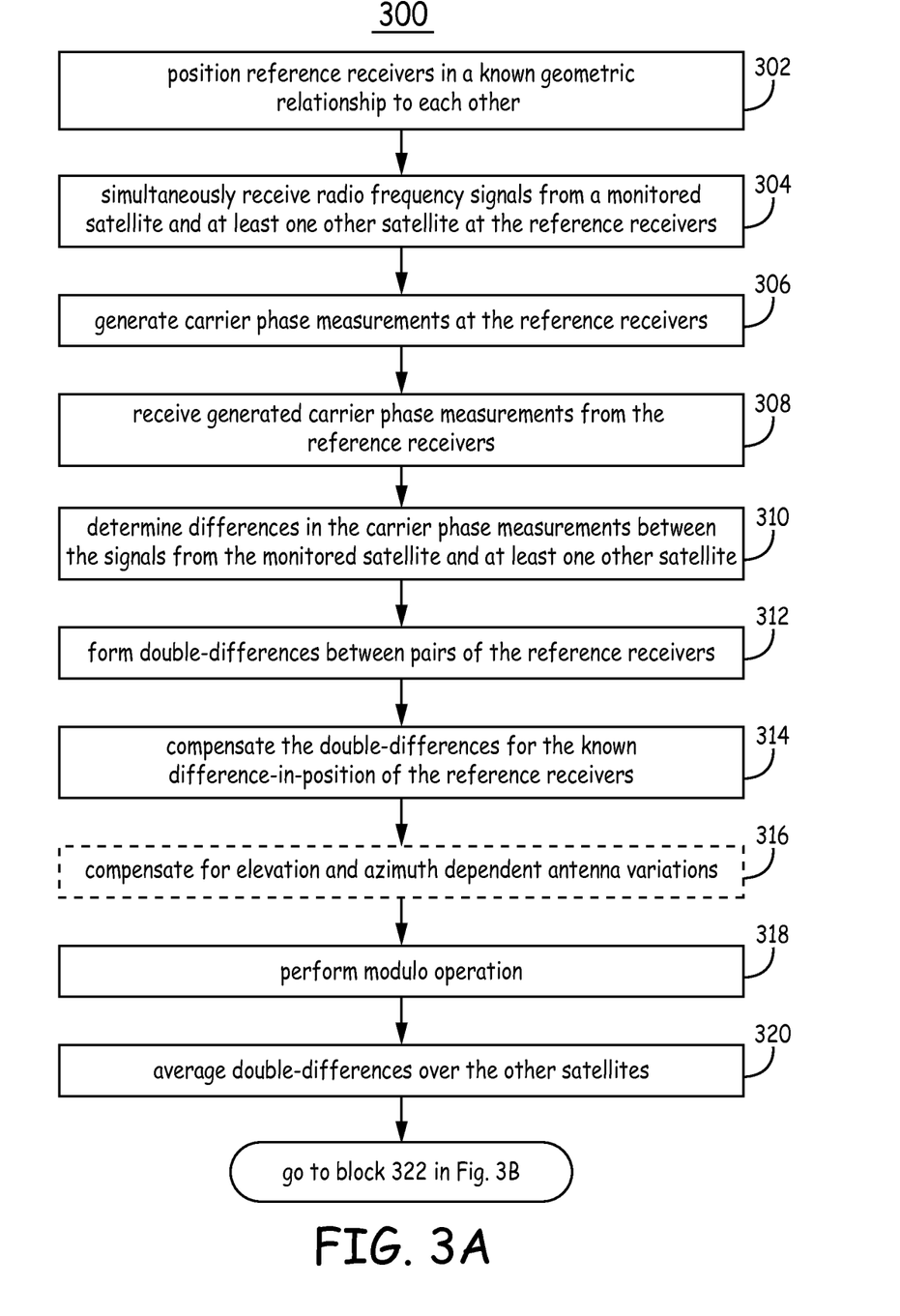
FIGS. 3A and 3B shows flowcharts representative of one embodiment of a method to monitor for excessive delay gradients in accordance with the present invention.
Figure 3B:
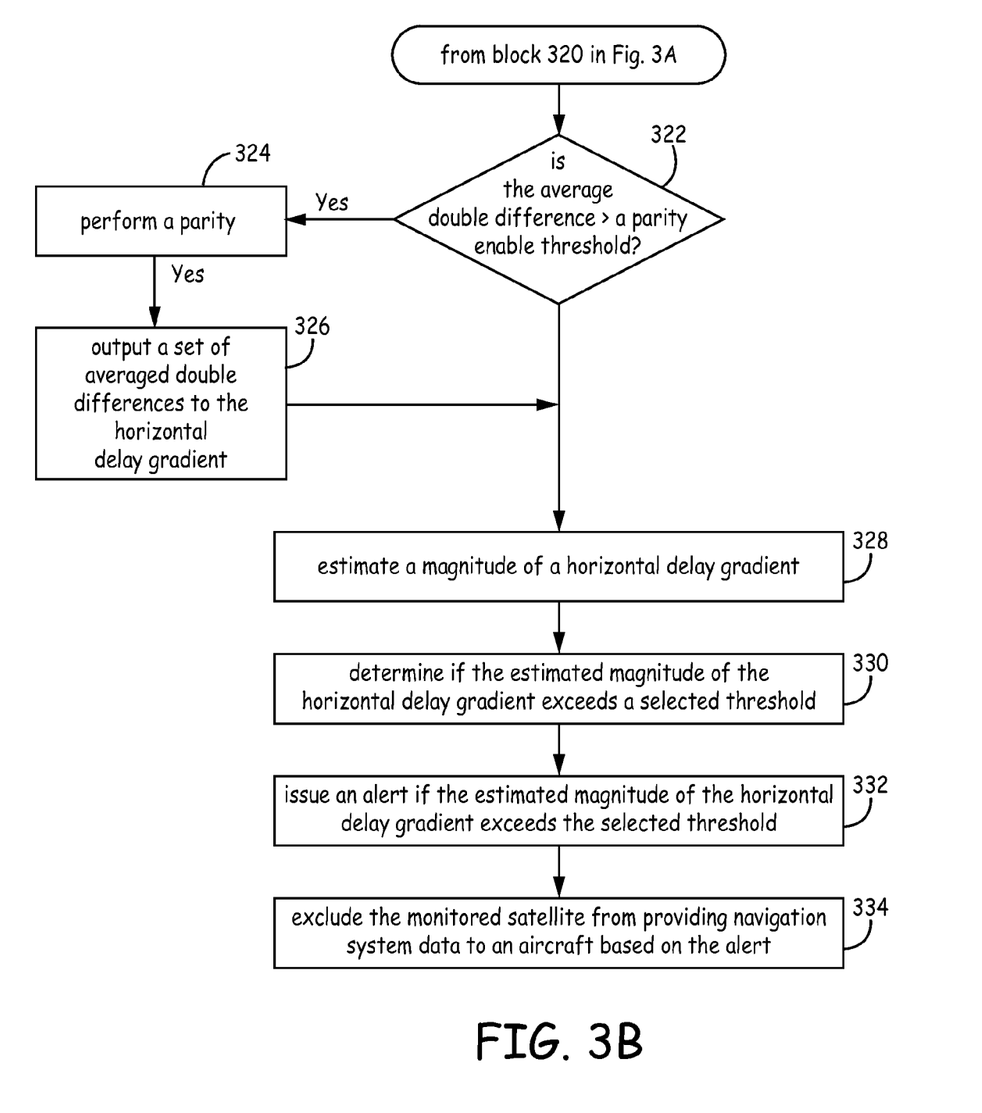

The implementation of the processing function 100 is now described in detail, with reference to FIGS. 3A and 3B. The method 300 is described with reference to the ground station 90 to monitor for ionospheric delay gradients such as shown in FIG. 1 and with reference to the processing module 100 shown in FIG. 2 although it is to be understood that method 300 can be implemented using other embodiments of the system as is understandable by one skilled in the art who reads this document. The flow for method 300 occurs for each sample period for each reference receiver 251-254.

The method 300 is described for four reference receivers 251-254 using a set of satellites 200(2-K) (K is an integer less than or equal to N) for comparison with the monitored satellite 200-1. The satellites 200(1-N) are in view of the reference receivers 251-254. As defined herein, a satellite is in view of a reference receiver if the radio frequency signals transmitted from the satellite are received by an antenna with sufficient power to be tracked in the reference receiver.

FIGS. 3A and 3B shows flowcharts representative of one embodiment of a method 300 to monitor for horizontal delay gradients caused by anomalous ionospheric delay gradients along the line of sight to a satellite from a ground reference receiver in accordance with the present invention. The method 300 is described with reference to the ground station 90 to monitor for ionospheric delay gradients such as shown in FIG. 1 and with reference to the processing function 100 shown in FIG. 2 although it is to be understood that method 300 can be implemented using other embodiments of the system as is understandable by one skilled in the art who reads this document.

At block 302, at least three reference receivers 251-254 are positioned in a known geometric relationship to each other. In one implementation of this embodiment, four reference receivers 251-254 are positioned in a known relationship to each other. At block 304, radio frequency signals 450-1 and 450-2 are simultaneously received from the monitored satellite 200-1 and at least one other satellite 200-2 at the at least three reference receivers 251-254. In one implementation of this embodiment, radio frequency signals 450(1-K) are simultaneously received from the respective monitored satellite 200-1 and the K−1 other satellites 200(2-K) at the four reference receivers 251-254 where K is an integer that is less than or equal to N. The reference receivers are able to determine which signal came from which satellite by a pseudorandom code specific to each satellite or by other data received from the satellite that is used to identify the satellite.

At block 306, the reference receivers 251-254 generate carrier phase measurements for the radio frequency signals 450-1 received from the monitored satellite 200-1 and for the radio frequency signals 450-2 simultaneously received from another satellite 200-2. If there are four reference receivers 251-254 and K−1 other satellites 200(2-K) that are being used in addition to the monitored satellite 200-1, then the reference receivers 251-254 generate carrier phase measurements for the radio frequency signal 450-1 received from the monitored satellite 200-1 and for radio frequency signals 450(2-K) simultaneously received from the K−1 other satellites 200(2-K). In one embodiment, all of the other satellites 200(2-N) are used to monitor the monitored satellite 200-1. The reference receivers 251-254 send information indicative of the generated carrier phase measurements to the processing function 100 via wireless or wired links 105 (FIG. 1).

At block 308, the satellite differencing module 110 of the processing function 100 receives the generated carrier phase measurements from at least three reference receivers 251-254.

At block 310, the satellite differencing module 110 determines differences in the carrier phase measurements between the signals from the monitored satellite and the at least one other satellite. The carrier phase measurements are accepted at the satellite differencing module 110 from the at least three reference receivers. The satellite differencing module 110 determines differences in the carrier phase measurements between the radio frequency signals 450-1 received from the monitored satellite 200-1 at the reference receivers 251-254 and the radio frequency signals 450(2-K) received from at least a set 200(2-K) of the other satellites at the reference receivers 251-254.

For example, the satellite differencing module 110 takes the difference between the instantaneous carrier phase measurement for the first satellite 200-1 at the first reference receiver 251 and the instantaneous carrier phase measurement for the second satellite 200-2 at the first reference receiver 251. The satellite differencing module 110 takes the difference between the instantaneous carrier phase measurement for the first satellite 200-1 at the second reference receiver 252 and the instantaneous carrier phase measurement for the second satellite 200-2 at the second reference receiver 252. The satellite differencing module 110 takes the difference between the instantaneous carrier phase measurement for the first satellite 200-1 at the third reference receiver 253 and the instantaneous carrier phase measurement for the second satellite 200-2 at the third reference receiver 253. The satellite differencing module 110 takes the difference between the instantaneous carrier phase measurement for the first satellite 200-1 at the fourth reference receiver 254 and the instantaneous carrier phase measurement for the second satellite 200-2 at the fourth reference receiver 254.

If there are two satellites 200(2-3) in the set of other satellites (three total satellites including the monitored satellite), then the satellite differencing module 110 takes the difference between the instantaneous carrier phase measurement for the first satellite 200-1 at the first reference receiver 251 and the instantaneous carrier phase measurement for the third satellite 200-3 at the first reference receiver 251. The satellite differencing module 110 takes the difference between the instantaneous carrier phase measurement for the first satellite 200-1 at the second reference receiver 252 and the instantaneous carrier phase measurement for the third satellite 200-3 at the second reference receiver 252. The satellite differencing module 110 takes the difference between the instantaneous carrier phase measurement for the first satellite 200-1 at the third reference receiver 253 and the instantaneous carrier phase measurement for the third satellite 200-3 at the third reference receiver 253. The satellite differencing module 110 takes the difference between the instantaneous carrier phase measurement for the first satellite 200-1 at the fourth reference receiver 254 and the instantaneous carrier phase measurement for the third satellite 200-3 at the fourth reference receiver 254.

In this manner the satellite differencing module 110 establishes (K−1) differences $\delta\phi^m_{n,k}$ for each reference receiver, where "m" is the positive integer for the $m^{th}$ reference receiver, "n" is the positive integer for the $n^{th}$ commonly evaluated satellite (monitored satellite), and "k" is the positive-integer for the $k^{th}$ other satellite.

The satellite differencing module 110 determine the differences, which can be shown in a matrix format. When there are four satellites (including the monitored satellite) then the difference matrix for the first reference receiver 251 has the following form:

$$\begin{bmatrix} \delta\phi^1_{1,2} \\ \delta\phi^1_{1,3} \\ \delta\phi^1_{1,4} \end{bmatrix} \quad (1)$$

The satellite differencing module 110 likewise generates a difference matrix for the second reference receiver 252, which has the following form:

$$\begin{bmatrix} \delta\phi^2_{1,2} \\ \delta\phi^2_{1,3} \\ \delta\phi^2_{1,4} \end{bmatrix} \quad (2)$$

The satellite differencing module 110 likewise generates a difference matrix for the third reference receiver 253, which has the following form:

$$\begin{bmatrix} \delta\phi^3_{1,2} \\ \delta\phi^3_{1,3} \\ \delta\phi^3_{1,4} \end{bmatrix} \quad (3)$$

The satellite differencing module 110 likewise generates a difference matrix for the fourth reference receiver 254, which has the following form:

$$\begin{bmatrix} \delta\phi^4_{1,2} \\ \delta\phi^4_{1,3} \\ \delta\phi^4_{1,4} \end{bmatrix} \quad (4)$$

Thus, the satellite differencing module calculates (K−1) differences 80 for each reference receiver that provides input to the satellite differencing module 110, where K is the number of satellites in the set. These differences reflect the relative phase within 0° to 360° between the radio frequency signals 450(1-K) transmitted from the first satellites 200-1 and the other satellites in the set 200(2-K). The satellite differencing module 110 sends the satellite differences $\delta\phi^m_{n,k}$ to the double differencing module 120. The double differencing module 120 accepts the satellite differences $\delta\phi^m_{n,k}$ from the satellite differencing module 110.

In one implementation of this embodiment, the satellite differencing module 110 is configured to perform a dual processing of the carrier phase measurements between the signals from the monitored satellite and at least one other satellite. In this latter case, the processing module 100 detects and avoids measurements at a discontinuity (i.e., at either 0 or at λ/2) as described in the patent application entitled GROUND-BASED SYSTEM AND METHOD TO EXTEND THE DETECTION OF EXCESSIVE DELAY GRADIENTS USING DUAL PROCESSING filed as application Ser. No. 14/253,431 on the same day herewith.

At block 312, the double differencing module 120 forms double differences ($d_{n,k}$) between pairs of the reference receivers 270-274. The double differences for the first pair 270 is the difference in $\delta\phi^m_{n,k}$ between first reference receiver 251 and second reference receiver 252, which is mathematically represented as $$d_{n,k}[RR1, RR2] = \delta\phi^2_{n,k} - \delta\phi^1_{n,k}. \quad (5)$$

If there are four reference receivers and three other satellites for a monitored satellite, the double differences between the first pair 270 are obtained by subtracting equation (1) from equation (2) to obtain $d_{n,k}[RR1,RR2] = \delta\phi^2_{n,k} - \delta\phi^1_{n,k}$; the double differences between the second pair 271 are obtained by subtracting equation (1) from equation (3) to obtain $d_{n,k}[RR1,RR3] = \delta\phi^3_{n,k} - \delta\phi^1_{n,k}$; and the double differences between the third pair 272 are obtained by subtracting equation (1) from equation (4) to obtain $d_{n,k}[RR1,RR4] = \delta\phi^4_{n,k} - \delta\phi^1_{n,k}$ and so forth.

At block 314, the double differencing module 120 compensates the double-differences for the known difference-in-position of the reference receivers in the pairs. This compensation is a geometric compensation process in which the difference-in-position is projected on the line of sight to the satellite. The known geometric relationship of the common reference receiver 251 (in the pairs 270-272) to the other reference receivers 252-254 and the unit vector defining the line of sight are used in this step of the process. As described above, the known geometric relationship is indicated by vector <u>a</u> from the first reference receiver 251 to the second reference receiver 252; vector <u>b</u> from the first reference receiver 251 to the third reference receiver 253; vector <u>c</u> from the first reference receiver 251 to the fourth reference receiver 254; vector <u>d</u> from the second reference receiver 252 to the fourth reference receiver 254; and vector <u>e</u> from the third reference receiver 253 to the fourth reference receiver 254.

At block 316, the double differencing module 120 compensates for elevation and azimuth dependent antenna variations between the pairs of reference receivers 270-274. In one implementation of this embodiment, the double differencing module 120 uses a function series (such as spherical harmonics) to compensate for elevation and azimuth dependent antenna variations between the antennas. In another implementation of this embodiment, the double differencing module 120 uses tabulated numbers and interpolation to compensate for elevation and azimuth dependent antenna variations between the antennas. Block 316 is optional and in some embodiments there is no compensation for elevation and azimuth dependent antenna variations between the antennas associated with the respective reference receiver pairs.

At block 318, the double differencing module 120 performs a modulo operation on the compensated double-differences. The modulo operation limits the phase to a range of minus one-half wavelength to plus one-half wavelength ($\pm\lambda/2$) by subtracting a whole number of wavelength.

At block 320, the double differencing module 120 averages the double-differences over the other satellites for the formed double-differences for the pairs 270, 271, and 272. The averaged double-differences for the first (monitored) satellite 200-1 with reference to the first pair 270 of reference receivers 251 and 252 is:

$$[d_1[RR1,RR2] = 1/(K-1)\{d_{1,2}[RR1,RR2] + \ldots + d_{1,K}[RR1,RR2]\}. \tag{6}$$

The averaged double-difference for first (monitored) satellite 200-1 with reference to the second pair 271 of reference receivers 251 and 253 is:

$$[d_1[RR1,RR3] = 1/(K-1)\{d_{1,2}[RR1,RR3] + \ldots + d_{1,K}[RR1,RR3]\}. \tag{7}$$

Likewise, the averaged double-differences for first (monitored) satellite 200-1 with reference to the third pair 272 of reference receivers 251 and 254 is:

$$[d_1[RR1,RR4] = 1/(K-1)\{d_{1,2}[RR1,RR4] + \ldots + d_{1,K}[RR1,RR4]\}, \tag{8}$$

and so forth.

If more than one satellite 200(1-N) is being monitored, the averaged double-difference for a second monitored satellite (such as satellite 200-2) for the first pair 270 of reference receivers 251 and 252 is:

$$([d_2[RR1,RR2] = 1/(K-1)\{d_{2,1}[RR1,RR2] + d_{2,3}[RR1,RR2] + \ldots + d_{2,K}[RR1,RR2]\} \tag{9}$$

and so forth, as is understandable to one skilled in the art upon reading and understanding this document. If the averaging is performed over all the other N−1 satellites, then the term (1-N) replaces (1-K) in the denominator of equations (6)-(9) and N replaces K in the sum.

In one implementation of this embodiment, the components of the sum in equations (6)-(9) are weighted by the 1σ phase noise, and the noise components do not all have the same weight as shown in equations (6)-(9). Most noise errors in the radio frequency signals 400(1-N) can be predicted based on standard multipath and thermal noise models.

In one embodiment, the double differencing module 120 also filters the double-differences to reduce noise content. In another embodiment, the double differencing module is further configured to average the compensated double-differences over time. In yet another embodiment, the double differencing module is configured to average the compensated double-differences over time and to filter the double-differences to reduce noise content.

The flow proceeds from block 320 in FIG. 3A to block 322 in FIG. 3B.

At block 322, selection logic 115 determines if the averaged double-difference determined in the double differencing module 120 at block 320 exceeds a parity enable threshold (also referred to herein as a double-difference threshold) for any one of reference receiver pairs 270-274. In one implementation of this embodiment, the double-difference threshold is large when measurements are near a discontinuity. If the double difference exceeds the double-difference threshold for one of the reference receiver pairs in the reference receivers 251-254 (FIG. 1) during a sample period, the selection logic 115 directs the averaged compensated double differences to the parity test module 130. In this case, the flow proceeds from block 322 to block 324 and the averaged compensated double differences for the reference receiver pairs are subjected to the parity test.

For the sample period in which the measurement undergoes a parity check at block 320, the selection logic 115 does not output measurements for the sample period to the gradient estimator module 130 without first performing the parity test. Thus, for each sample period, the selection logic 115 sends its output to either the parity test module 140 or to the gradient estimator module 130.

At block 324, a parity test is performed at the parity test module 140. The parity test module 130 is configured to input the averaged compensated double differences when the average of the compensated double differences over the other satellites among the at least two satellites exceed a parity enable threshold. The parity test determines which of all measurement permutations (combinations of +/− sign changes) has the smallest parity or a parity that is less than a parity threshold.

The parity measurement test corrects for inconsistent measurements between the reference receiver pairs 270-274. For example, if the measurements from any one of the reference receivers pairs 270-274 are near ±λ/2 (i.e., near a discontinuity) the measurements from the reference receiver pairs 270-274 have a distinct probability of canceling each other. This cancellation of measurements near a discontinuity leads to missed detections or incorrect re-admittance. For example, if one reference receiver pair (e.g., 271) measures +95 mm and the reference receiver pair 273 measures −95 mm, these measurements "cancel" each other when combined.

The parity test module 140 detects and corrects for inconsistent measurements by determining a parity (parity value) from all measurement permutations (i.e., combinations of +/− sign changes). In one implementation of this embodiment, the satellite carrier wavelength is 190 mm, an angular phase difference of 180 degrees is equal to a "half wavelength" or "95 mm", and the double-difference threshold is plus or minus a "quarter wavelength" or "±45 mm".

The measurement parity requires measurement redundancy. The parity test module 140 analyses the six measurements provided by the four reference receiver pairs 270-274. A minimum of any three measurements are needed such that they include all reference receiver pairs.

In one implementation of this embodiment, all six available measurements, measurements along vectors a to e plus the measurement from the diagonally positioned paired reference receivers 252 and 253, are tested. In another implementation of this embodiment, only the four outside measurements (along vectors $\underline{a}$, $\underline{b}$, $\underline{d}$, and $\underline{e}$) for the reference receivers 251-254 are tested. In this case, the diagonal reference receiver pair 272 and the other diagonally positioned paired reference receivers 252 and 253 are not tested.

A measurement matrix H is constructed from known geometry of the reference receivers 251-254. The H matrix with the appropriate parity measurements is similar to the discriminator H matrix shown below as equation (10).

Based on the difference measurements, a parity matrix V is computed to satisfy the parity equations VH=0 and $VV^T$=I. The vector $\underline{z}$ is the parity measurement vector similar to that shown below as equation (12). When a set of parity measurements are well behaved (i.e., away from discontinuities), V$\underline{z}$ is zero except for measurement noise. The parity test determines if V$\underline{z}$<(multiplier*noise). For example, if the multiplier is 4 and the noise is 6 mm, then $V_z$ must be less than (4*6=24 mm) for the measurement to be valid.

When a measurement is not well behaved (i.e., near a discontinuity at the ±λ/2 boundary), the measurement may have the wrong +/− sign. This creates inconsistent measurements. The parity test module 140 test all permutations of measurement +/− signs. For 3 measurements there are 8 permutations. For 4 measurements there are 16 permutations. For 5 measurements there are 32 permutations. For 6 measurements there are 64 permutations. In one implementation of this embodiment, only half of the permutations are tested, since half of the permutations have the same parity value. The smaller the parity values are the more consistent (good) the measurements associated with that permutation.

At block 326, a set of the averaged compensated double-differences are output from the parity test module 140 for further processing at the gradient estimator module 130 based on the parity value of the reference receiver pairs. There is likely to be more than one good permutation. In one implementation of this embodiment, if there is more than one good permutation with a small parity value, the measurements from the reference receiver pair that have the parity values small enough to be a good permutation are output to the gradient estimator module 130 from the parity test module 140.

In another implementation of this embodiment, the parity test module 140 is operable to direct, for further processing, the set of the averaged compensated double differences associated with the reference receiver pair having the smallest parity value of all the determined parity values. In yet another implementation of this embodiment, the parity test module 140 is operable to direct for further processing the averaged compensated double differences associated with the reference receiver pairs having a parity value less than a parity threshold.

The measurements from the reference receiver pair that has a small parity value (i.e., the smallest parity value of all the calculated parity values) are output to the gradient estimator module 130 from the parity test module 140. The input provided to the gradient estimator module 130 is the set of averaged compensated (including modulo operation) double differences that have the lowest parity.

If, at block 322 it is determined by the selection logic 115 that the averaged double-difference determined in the double differencing module 120 at block 320 does not exceeds double-difference threshold for any one of reference receiver pairs 270-274, the flow of method 300 proceeds to block 328 without performing a parity test. By proceeding from the double differencing module 120 (via the selection logic 115) without the parity check of the parity test module 140, the noise in measurements for each sample are not forced to have the same +/− sign during fault free conditions.

The double differencing module 120 is communicatively coupled to provide input to the gradient estimator module 130. The input provided to the gradient estimator module 130 is the averaged compensated (including modulo operation) double differences. The averaged compensated double differences are accepted at the gradient estimator module 130.

At block 328, the gradient estimator module 130 estimates a magnitude of the horizontal delay gradient resulting from the gradient 22 in the ionosphere 20 between the monitored satellite 200-1 and the pairs 270-272 of reference receivers 251-254 based on the input from either the parity test module 140 or the double differencing module 120 for each sample. An embodiment of the algorithms executed by at least one processor 160 in the processing function 100 of the ground station 90 that are used to estimate the horizontal delay gradients for reference receivers 251-254 (i.e., for only three reference receivers) are now described. The set of three reference receivers 251-253 is mathematically represented herein as {RR1, RR2, RR3}. The coordinate system (x, y) is in the tangent plane of the surface of the ground station in which the ground based system is located also herein referred to as the horizontal plane. The first reference receiver RR1 is at the origin of the (x, y) coordinate system. The second reference receiver RR2 is located at $\underline{a}^T$=(ax, ay) and the third reference receiver RR3 is located at $\underline{b}^T$=(bx, by) with respect to the first reference receiver RR1. The position gradient measurement matrix H (size 2×2) is written as:

$$H = \begin{bmatrix} \underline{a}^T \\ \underline{b}^T \end{bmatrix}. \tag{10}$$

The noise from each receiver is designated as $\{w_1, w_2, w_3\}$ for $\{RR1, RR2, RR3\}$ respectively. The measurement noise vector $\underline{w}$ (size 2×1) is:

$$\underline{w} = \begin{bmatrix} w_2 - w_1 \\ w_3 - w_1 \end{bmatrix}. \tag{11}$$

The measurement vector is $\underline{z}$ (size 2×1) so that:

$$\underline{z} = H\underline{G} + \underline{w}, \tag{12}$$

where $\underline{G}$ (size 2×1) is the true excessive gradient vector (to be measured by the gradient estimator module 130) and the averaged compensated double differences in z are in meters as follows:

$$z = \begin{bmatrix} d_n[RR2, RR1] \\ d_n[RR3, RR1] \end{bmatrix}. \tag{13}$$

The noise processes $\{w_1, w_2, w_3\}$ include thermal and broadband noise, multipath noise, residual antenna variation (after compensation), and normal gradients. The delay gradient in the tangent plane (x, y) is estimated based on the averaged compensated double differences in $\underline{z}$. The noise vector $\underline{w}$ has correlated components. However each receiver specific noise is uncorrelated versus other reference receivers. The covariance of the noise, R, is then $$R = E[\underline{w}\,\underline{w}^T] = E\left[\begin{bmatrix} w_2 - w_1 \\ w_3 - w_1 \end{bmatrix}[w_2 - w_1 \; w_3 - w_1]\right] = \begin{bmatrix} \sigma_2^2 + \sigma_1^2 & \sigma_1^2 \\ \sigma_1^2 & \sigma_3^2 + \sigma_1^2 \end{bmatrix}, \tag{14}$$

where $\sigma_m^2$ is the 1σ noise variance at the $m^{th}$ reference receiver $RR_m$.

At block 330, the gradient estimator module 130 determines if at least one of the estimated gradients $\hat{G}_n$ exceeds the selected gradient threshold T. The selected gradient threshold is stored in the memory 150 or the storage medium 170. The selected gradient threshold is set high enough so that it is not exceeded by noise only. The noise may be different in different directions and this is considered when setting the gradient threshold. When a gradient anomaly is present, the probability of a missed detection $p_{md}$ can be calculated by using the non-central $\chi^2$ distribution.

At block 332, the gradient estimator module 130 issues an alert if the estimated magnitude of the horizontal delay gradient exceeds the selected gradient threshold. The alert can be an alert signal and/or an exclusion command. In one embodiment, an exclusion command is sent from the horizontal delay gradient monitor 95 to the ground station broadcast 92. In another embodiment, an alert signal is sent from the horizontal delay gradient monitor 95 to the ground station broadcast 92. In another embodiment, an alert signal is also sent from the horizontal delay gradient monitor 95 to the ground station 90 and the ground station 90 is communicatively coupled to a display to alert an air traffic controller based on the issuing of the alert.

At block 334, the ground station 90 takes steps to cease the broadcast or to exclude the affected monitored satellites from providing navigation system data to an aircraft 40 via the communication link 41 (FIG. 1) if at least one of the monitored satellites has an estimated gradient that exceeded the gradient threshold. For example, the ground station broadcast 92 receives the exclusion command output from the gradient estimator module 130 and modifies the broadcast messages to the aircraft 40 in the region to stop the aircraft 40 from using the information from the monitored satellites which are experiencing the gradient anomaly. If necessary, the ground station 90 takes steps to cease the broadcast from the ground station broadcast 92 if at least one of the monitored satellites has an estimated gradient that exceeded the gradient threshold.

In one implementation of this embodiment, all the double differences are formed between the first reference receiver 251 and all other valid reference receivers 252-254 for all valid satellites 200(1-N) in view of the reference receivers 251-254. In another implementation of this embodiment, the double differences are formed between the first reference receiver 251 and all other valid reference receivers 252-254 for a set 200(1-K) of the valid satellites 200(1-N), where K≤N. In another embodiment, all the satellites 200(1-N) that are transmitting to the reference receivers 251-254 are monitored satellites and a set of the other satellites are used as described herein to determine the horizontal delay gradient in the satellite signals from each of the monitored satellites. In yet another embodiment, all the satellites 200(1-N) that are transmitting to the reference receivers 251-254 are monitored satellites and all of the other satellites are used as described herein to determine the horizontal delay gradient in the satellite signals from each of the monitored satellites.

In one embodiment, a weighted combination of the squared x-component and squared y-component is formed and compared to a second gradient threshold. If the gradient threshold is exceeded for one satellite (e.g., an $n^{th}$ satellite but no other satellite exceeds their second gradient threshold, an anomaly has been detected in the $n^{th}$ satellite and the $n^{th}$ satellite is excluded from providing navigation data for an aircraft.

Embodiments of the systems and methods described herein can be used to reduce the threat to navigation systems in aircraft due to anomalous gradients in the electron density of the ionosphere.

Example Embodiments

Example 1 includes a processing function to monitor a horizontal delay gradient in satellite signals, the processing function comprising: a satellite differencing module configured to receive carrier phase measurements for at least two satellites from at least three reference receivers, the at least two satellites including a monitored satellite and at least one other satellite, wherein the at least three reference receivers have a known geometric relationship to each other, and wherein the satellite differencing module determines differences in the carrier phase measurements between signals from the monitored satellite and at least one of the at least one other satellite; a double differencing module configured to: form double-differences between one or more pairs of the at least three reference receivers based on the differences in the carrier phase measurements, compensate the double-differences between the pairs for the known difference-in-position of the reference receivers in the pairs, perform a modulo operation to limit the compensated double-differences to a range of minus one-half wavelength to plus one-half wavelength, and for the monitored satellite, average the double differences over the other satellites among the at least two satellites; and a parity test module configured to input the averaged compensated double differences when the average of the compensated double differences over the other satellites among the at least two satellites exceed a parity enable threshold; and a gradient estimator module configured to estimate a magnitude of the horizontal delay gradient based on a set of the averaged compensated double-differences input from the parity test module.

Example 2 includes the processing function of Example 1, further comprising; selection logic configured to: determine if the averaged compensated double differences for the reference receiver pairs are greater than the parity enable threshold; and direct the averaged compensated double differences to the parity test module when the average of the compensated double differences exceed the parity enable threshold.

Example 3 includes the processing function of any of Examples 1-2, wherein the parity test module is operable to output, for further processing, the set of averaged compensated double differences associated with a reference receiver pair having a smallest parity value of all the determined parity values.

Example 4 includes the processing function of any of Examples 1-3, wherein the parity test module is operable to output, for further processing, the set of averaged compensated double differences associated with at least one reference receiver pair having a respective at least one parity value less than a parity threshold.

Example 5 includes the processing function of any of Examples 1-4, wherein the double differencing module is further configured to filter the compensated double-differences to reduce noise content.

Example 6 includes the processing function of any of Examples 1-5, wherein the double differencing module is further configured to compensate for elevation and azimuth dependent antenna variations between antennas respectively associated with the at least three reference receiver pairs.

Example 7 includes a method of monitoring for a delay gradient to a monitored satellite, the method comprising: receiving carrier phase measurements from at least three reference receivers, wherein the at least three reference receivers substantially simultaneously receive radio frequency signals from the monitored satellite and at least one other satellite, and wherein the at least three reference receivers have a known geometric relationship to each other; determining differences in the carrier phase measurements between the signals from the monitored satellite and at least one other satellite for the at least three reference receivers; forming double-differences between pairs of the at least three reference receivers; compensating the double-differences for the known difference-in-position of the reference receivers in the pairs; performing a modulo operation on the compensated double-differences to limit the compensated double-differences to a range of minus one-half wavelength to plus one-half wavelength; averaging the compensated double differences over the at least one other satellites; directing the averaged compensated double differences to a parity test module when the averaged compensated double differences exceed a parity enable threshold; outputting a set of the averaged compensated double-differences input from the parity test module to a gradient estimator module; and estimating a magnitude of a horizontal delay gradient based on the set of averaged compensated double-differences.

Example 8 includes the method of Example 7, wherein directing the averaged compensated double differences to the parity test module when the averaged compensated double differences exceed the parity enable threshold comprises: determining if the averaged compensated double differences for the reference receiver pairs are greater than the parity enable threshold.

Example 9 includes the method of any of Examples 7-8, further comprising: outputting, for further processing, the set of averaged compensated double differences associated with a reference receiver pair having a smallest parity value of all the determined parity values.

Example 10 includes the method of any of Examples 7-8, further comprising: outputting, for further processing, the set of averaged compensated double differences associated with at least one reference receiver pair having a respective at least one parity value less than a parity threshold.

Example 11 includes the method of any of Examples 7-10, further comprising: determining if the estimated magnitude of the horizontal delay gradient exceeds a selected threshold.

Example 12 includes the method of Example 11, further comprising: excluding the monitored satellite from providing navigation system data to an aircraft if the estimated magnitude of the horizontal delay gradient exceeds the selected gradient threshold.

Example 13 includes the method of any of Examples 7-12, further comprising: filtering the averaged compensated double-differences to reduce noise.

Example 14 includes the method of any of Examples 7-13, further comprising: compensating for elevation and azimuth dependent antenna variations between antennas associated with the respective at least three reference receiver pairs.

Example 15 includes a ground based system to monitor for a horizontal delay gradient to a monitored satellite, the system comprising: at least three reference receivers configured to substantially simultaneously receive radio frequency signals from the monitored satellite and at least one other satellite, wherein the at least three reference receivers have a known geometric relationship to each other; and a processing function communicatively coupled to the at least three reference receivers, the processing function configured to: receive carrier phase measurements for the monitored satellite and at least one other satellite from the at least three reference receivers, determine differences in the carrier phase measurements between the signals transmitted from the monitored satellite and at least one other satellite and substantially simultaneously received at the at least three reference receivers, form double-differences between pairs of the at least three reference receivers based on the differences in the carrier phase measurements, compensate the double-differences for the known difference-in-position of the reference receivers in the pairs, perform a modulo operation to limit the compensated double-differences to a range of minus one-half wavelength to plus one-half wavelength, average the compensated double-differences over the other satellites for the monitored satellite at the pairs, and input the averaged compensated double differences at a parity test module when the average of the compensated double differences exceed a parity enable threshold; estimate a magnitude of the horizontal delay gradient based on a set of the averaged compensated double-differences input from the parity test module.

Example 16 includes the ground based system of Example 15, wherein the processing function is further configured to: determine if the averaged compensated double differences for the reference receiver pairs are greater than the parity enable threshold; and direct the averaged compensated double differences to the parity test module when the average of the compensated double differences exceed the parity enable threshold.

Example 17 includes the ground based system of any of Examples 15-16, wherein the processing function is further configured to output, for further processing, the set of averaged compensated double differences associated with a reference receiver pair having the smallest parity value of all the determined parity values.

Example 18 includes the ground based system of any of Examples 15-16, wherein the processing function is further configured to output, for further processing, the set of averaged compensated double differences associated with at least one reference receiver pair having a respective at least one parity value less than a parity threshold.

Example 19 includes the ground based system of any of Examples 15-18, wherein the processing function is further configured to compensate for elevation and azimuth dependent antenna variations between antennas associated with the respective at least three reference receiver pairs.

Example 20 includes the processing function of any of Examples 16-19, wherein the processing function is further configured to output at least one of an alert signal or exclusion command when the magnitude of the estimated delay gradient exceeds a selected gradient threshold.

Although specific embodiments have been illustrated and described herein, it will be appreciated by those skilled in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A processing module to monitor a horizontal delay gradient in satellite signals representative of an ionospheric delay gradient, the processing function comprising:
    a satellite differencing module configured to receive carrier phase measurements for at least two satellites from at least three reference receivers, the at least two satellites including a monitored satellite and at least one other satellite, wherein the at least three reference receivers have a known geometric relationship to each other, and wherein the satellite differencing module determines differences in the carrier phase measurements between signals from the monitored satellite and at least one of the at least one other satellite;
    a double differencing module configured to:
        form double-differences between one or more pairs of the at least three reference receivers based on the differences in the carrier phase measurements,
        compensate the double-differences between the pairs for the known difference-in-position of the reference receivers in the pairs,
        perform a modulo operation to limit the compensated double-differences to a range of minus one-half wavelength to plus one-half wavelength, and
        for the monitored satellite, average the double differences over the other satellites among the at least two satellites; and
    a parity test module configured to input the averaged compensated double differences when the average of the compensated double differences over the other satellites among the at least two satellites exceed a parity enable threshold; and
    a gradient estimator module configured to estimate a magnitude of the horizontal delay gradient based on a set of the averaged compensated double-differences input from the parity test module.

2. The processing module of claim 1, further comprising; selection logic configured to:
    determine if the averaged compensated double differences for the reference receiver pairs are greater than the parity enable threshold; and
    direct the averaged compensated double differences to the parity test module when the average of the compensated double differences exceed the parity enable threshold.

3. The processing module of claim 1, wherein the parity test module is operable to output, for further processing, the set of averaged compensated double differences associated with a reference receiver pair having a smallest parity value of all the determined parity values.

4. The processing module of claim 1, wherein the parity test module is operable to output, for further processing, the set of averaged compensated double differences associated with at least one reference receiver pair having a respective at least one parity value less than a parity threshold.

5. The processing module of claim 1, wherein the double differencing module is further configured to filter the compensated double-differences to reduce noise content.

6. The processing module of claim 1, wherein the double differencing module is further configured to compensate for elevation and azimuth dependent antenna variations between antennas respectively associated with the at least three reference receiver pairs.

7. A method of monitoring for a delay gradient to a monitored satellite representative of an ionospheric delay gradient, the method comprising:
    receiving carrier phase measurements from at least three reference receivers, wherein the at least three reference receivers substantially simultaneously receive radio frequency signals from the monitored satellite and at least one other satellite, and wherein the at least three reference receivers have a known geometric relationship to each other;
    determining differences in the carrier phase measurements between the signals from the monitored satellite and at least one other satellite for the at least three reference receivers;
    forming double-differences between pairs of the at least three reference receivers;
    compensating the double-differences for the known difference-in-position of the reference receivers in the pairs;
    performing a modulo operation on the compensated double-differences to limit the compensated double-differences to a range of minus one-half wavelength to plus one-half wavelength;
    averaging the compensated double differences over the at least one other satellites;
    directing the averaged compensated double differences to a parity test module when the averaged compensated double differences exceed a parity enable threshold;
    outputting a set of the averaged compensated double-differences input from the parity test module to a gradient estimator module; and
    estimating a magnitude of a horizontal delay gradient based on the set of averaged compensated double-differences.

8. The method of claim 7, wherein directing the averaged compensated double differences to the parity test module when the averaged compensated double differences exceed the parity enable threshold comprises:

determining if the averaged compensated double differences for the reference receiver pairs are greater than the parity enable threshold.

9. The method of claim 7, further comprising:
outputting, for further processing, the set of averaged compensated double differences associated with a reference receiver pair having a smallest parity value of all the determined parity values.

10. The method of claim 9, further comprising:
outputting, for further processing, the set of averaged compensated double differences associated with at least one reference receiver pair having a respective at least one parity value less than a parity threshold.

11. The method of claim 7, further comprising:
determining if the estimated magnitude of the horizontal delay gradient exceeds a selected threshold.

12. The method of claim 11, further comprising:
excluding the monitored satellite from providing navigation system data to an aircraft if the estimated magnitude of the horizontal delay gradient exceeds the selected gradient threshold.

13. The method of claim 7, further comprising:
filtering the averaged compensated double-differences to reduce noise.

14. The method of claim 7, further comprising:
compensating for elevation and azimuth dependent antenna variations between antennas associated with the respective at least three reference receiver pairs.

15. A ground based system to monitor for a horizontal delay gradient to a monitored satellite representative of an ionospheric delay gradient, the system comprising:
at least three reference receivers configured to substantially simultaneously receive radio frequency signals from the monitored satellite and at least one other satellite, wherein the at least three reference receivers have a known geometric relationship to each other; and
a processing function communicatively coupled to the at least three reference receivers, the processing function configured to:
receive carrier phase measurements for the monitored satellite and at least one other satellite from the at least three reference receivers,
determine differences in the carrier phase measurements between the signals transmitted from the monitored satellite and at least one other satellite and substantially simultaneously received at the at least three reference receivers,
form double-differences between pairs of the at least three reference receivers based on the differences in the carrier phase measurements,
compensate the double-differences for the known difference-in-position of the reference receivers in the pairs,
perform a modulo operation to limit the compensated double-differences to a range of minus one-half wavelength to plus one-half wavelength,
average the compensated double-differences over the other satellites for the monitored satellite at the pairs, and
input the averaged compensated double differences at a parity test module when the average of the compensated double differences exceed a parity enable threshold;
estimate a magnitude of the horizontal delay gradient based on a set of the averaged compensated double-differences input from the parity test module.

16. The ground based system of claim 15, wherein the processing function is further configured to:
determine if the averaged compensated double differences for the reference receiver pairs are greater than the parity enable threshold; and
direct the averaged compensated double differences to the parity test module when the average of the compensated double differences exceed the parity enable threshold.

17. The ground based system of claim 15, wherein the processing function is further configured to output, for further processing, the set of averaged compensated double differences associated with a reference receiver pair having the smallest parity value of all the determined parity values.

18. The ground based system of claim 15, wherein the processing function is further configured to output, for further processing, the set of averaged compensated double differences associated with at least one reference receiver pair having a respective at least one parity value less than a parity threshold.

19. The ground based system of claim 15, wherein the processing function is further configured to compensate for elevation and azimuth dependent antenna variations between antennas associated with the respective at least three reference receiver pairs.

20. The processing function of claim 16, wherein the processing function is further configured to output at least one of an alert signal or exclusion command when the magnitude of the estimated delay gradient exceeds a selected gradient threshold.

* * * * *